United States Patent [19]

Watanabe

[11] Patent Number: 4,710,867
[45] Date of Patent: Dec. 1, 1987

[54] VECTOR PROCESSING SYSTEM

[75] Inventor: Tadashi Watanabe, Tokyo, Japan

[73] Assignee: NEC Corporation, Tokyo, Japan

[21] Appl. No.: 753,943

[22] Filed: Jul. 11, 1985

[30] Foreign Application Priority Data

Jul. 11, 1984 [JP] Japan .................. 59-143578

[51] Int. Cl.$^4$ .................. G06F 7/48
[52] U.S. Cl. .................. 364/200
[58] Field of Search ... 364/200 MS File, 900 MS File

[56] References Cited

U.S. PATENT DOCUMENTS 4,128,880 12/1978 Cray, Jr. .................. 364/200

OTHER PUBLICATIONS

Anderson, et al, "The IBM System/360 Model 91: Floating-Point Execution Unit," IBM Journal of Research & Development, vol. 11, No. 1, pp. 34–53, Jan. 1967.

*Primary Examiner*—Thomas M. Heckler
*Attorney, Agent, or Firm*—Schwartz, Jeffery, Schwaab, Mack, Blumenthal & Evans

[57] ABSTRACT

A vector processing system having a main memory, at least one scalar register, a plurality of vector registers, a functional section for performing predetermined operations for at least a group of the vector elements of the vector register in response to a first instruction, a first storage device for storing a positive integer MVL corresponding to the storage locations to be used in each of the vector registers, a setting device for setting the number MVL in the first storage device, a control device responsive to a second instruction for transferring the content of the first storage device to one of the scalar registers and main memory, a second storage device for holding the number of vector elements in at least one vector register to be supplied to the functional section based upon the content MVL of the first storage device and a positive integer N corresponding to the number of vector operations specified by an instruction and read-out device for sequentially reading out the vector elements of the at least one vector register to the functional section in response to the content of the second storage device.

4 Claims, 8 Drawing Figures

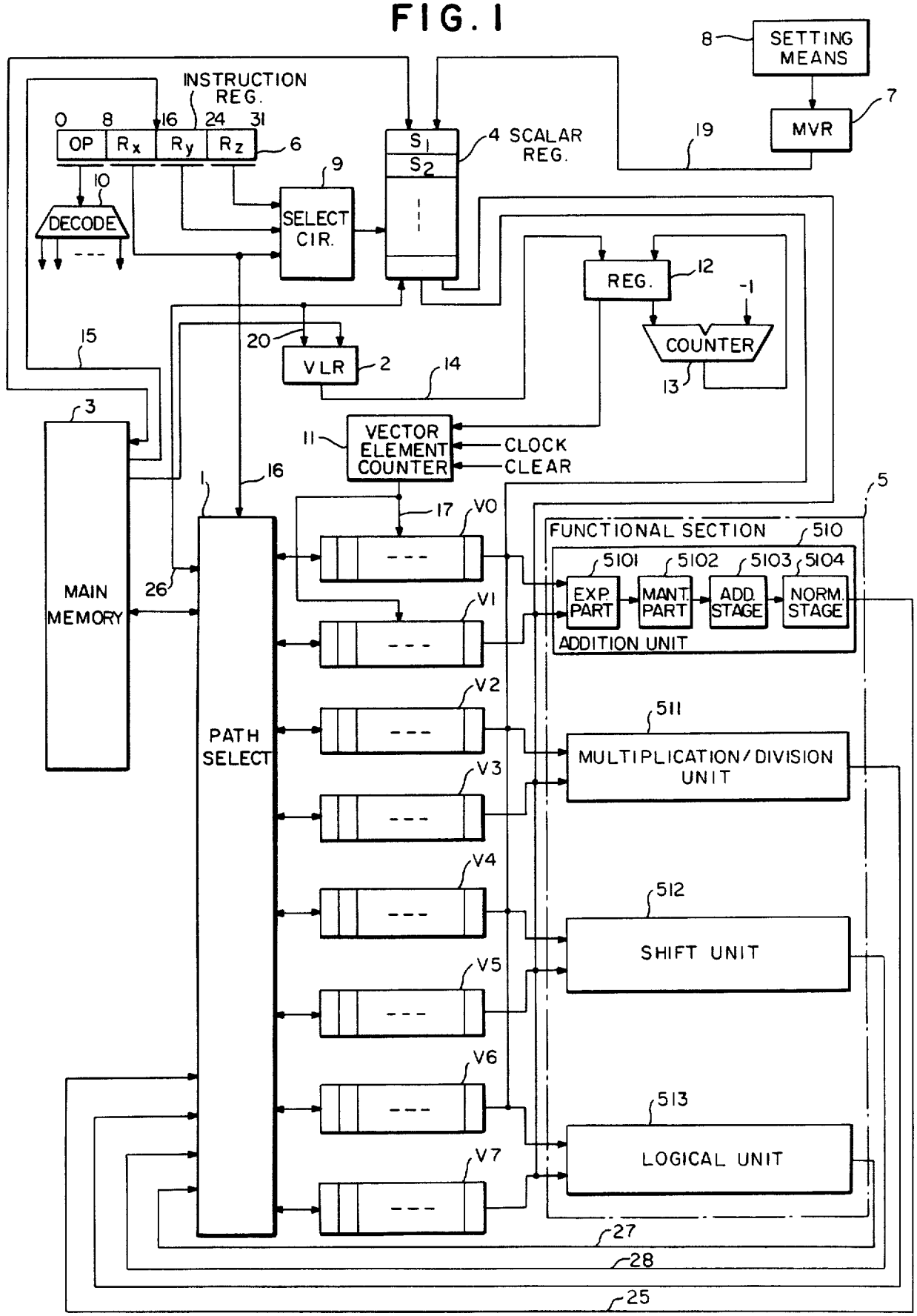

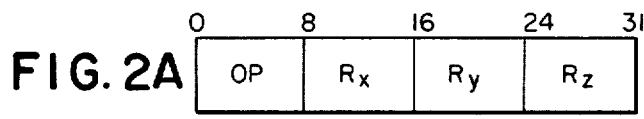
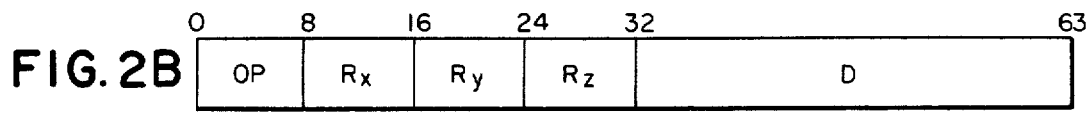
FIG. 3
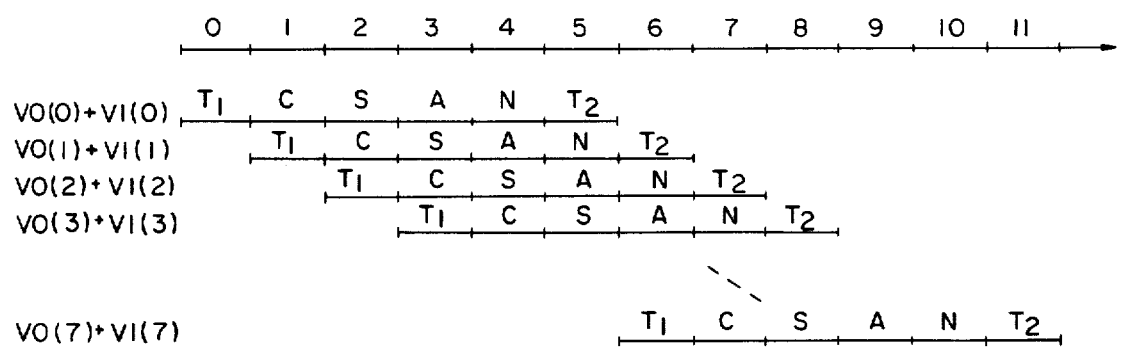
FIG. 6
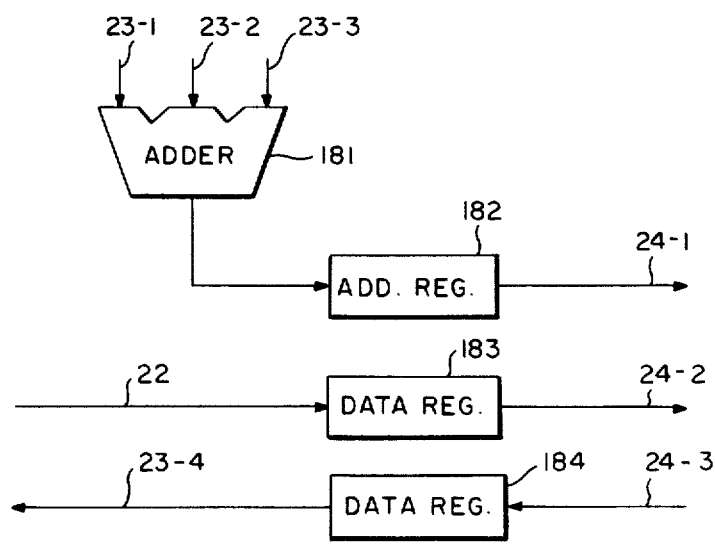

| | INSTRUCTION | | OPERATION | STEP NO. |
|---|---|---|---|---|
| | LDS | S1,M(N) | S1 ← N | (1) |
| | SMVL | S2 | S2 ← MVR | (2) |
| | ADD | S3,-1,S1 | S3 ← S1-1 | (3) |
| | ADD | S4,-1,S2 | S4 ← S2-1 | (4) |
| | AND | S5,S3,S4 | S5 ← S3 & S4 | (5) |
| | ADD | S6,1,S5 | S6 ← S5+1 | (6) |
| | SLL | S7,2,S6 | S7 ← S6 < 2 | (7) |
| | SLL | S8,2,S2 | S8 ← S2 < 2 | (8) |
| | OR | S9,4,0 | S9 ← 4 | (9) |
| LOOP | LVL | S6 | VL ← S6 | (10) |
| | ADD | S9,S9,S7 | S9 ← S9+S7 | (i+1) |
| | OR | S7,0,S8 | S7 ← S8 | (i+2) |
| | SUB | S1,S1,S6 | S1 ← S1-S6 | (i+3) |
| | OR | S6,0,S2 | S6 ← S2 | (i+4) |
| | BNZ | S1,LOOP | BNZ ← S1,LOOP | (i+5) |

VECTOR PROCESSING SYSTEM

BACKGROUND OF THE INVENTION

This invention relates to a vector processing system and, more particularly, to a vector processing system capable of setting the number of storage locations to be used in vector registers.

An example of a prior art vector processing system is proposed in U.S. Pat. No. 4,128,880. The proposed system is equipped with eight vector registers each having 64 storage locations to execute vector processing for vector data within each storage location of the respective vector registers. The length of one vector register, that is, the number of storage locations in one vector register, will be referred herein to as a maximum vector length (MVL). In vector processing, in response to an instruction, the number of vector elements to be executed is first stored in storage means called a vector length register used to hold the number of vector operations to be executed. Next, the vector elements are sequentially read out of the vector registers to a vector functional unit by the number corresponding to the value stored in the vector length register, the operation (for example, an add operation, a multiplication operation and so on) specified with the instruction is executed in respect of the vector elements read out, and the results of the operation are sequentially stored in other vector register or in a main memory. Now, if the number N of repetitions of a loop part of a program written in the FORTRAN language or other programming languages is equal to or less than the MVL, the number N is stored in the vector length register, several sets of the N vector elements are stored in the vector registers specified by the instruction, respectively, and the specified operation in the program loop is executed for the N vector elements sequentially read out of the vector registers. On the other hand, if N is larger than the MVL, the value M obtained by adding "1" to the remainder of (N−1)/MVL is first stored in the vector 40 length register to execute the first processing. In the first processing, several sets of the M vector elements are stored in the specified vector registers, respectively, and the specified operation is executed for the sets of the M vector elements. In the second processing, the MVL is then loaded by the program into the vector length register, several sets of the MVL number vector elements are stored in the specified vector registers, respectively, and the specified operation is carried out for the sets of the MVL vector elements. Such second processing is repeated [(N−1)/MVL] times with the remaining sets of the vector elements where [(N−1)/MVL] means the largest integer which does not exceed (N−1)/MVL. In this manner, although the program loop having the relation of N>MVL can be processed in the prior art system, an object program must have the MVL as a constant. As a result, in order to execute the object program with some vector processing system provided with vector registers, each of which has a smaller number of storage locations than the corresponding one used in the above-mentioned prior art system, some re-compiling step of the program is indispensable to changing the MVL to be adaptable to those vector registers having such fewer number of storage locations. Generally, when vector processing systems are manufactured for commercial purposes, a plurality of design models, which are provided with vector registers having different MVLs are sometimes prepared so as to meet various demands of users at an optimal cost-performance rate. As a result, object programs corresponding to such models must be prepared, because they are not interchangeable between those models.

One object of this invention is, therefore, to provide a vector processing system free from the above-mentioned disadvantages in the prior art system.

SUMMARY OF THE INVENTION

According to one aspect of this invention, there is provided a vector processing system which comprises: a main memory for storing instructions and operands; at least one scalar register accessible by each of said instructions; a plurality of vector registers, each having a plurality of storage locations for holding a plurality of vector elements of an ordered set of data; functional means for performing a predetermined operation for at least one set of said vector elements in at least one vector register in response to a first instruction; first storage means for storing the number MVL (a positive integer) of storage locations to be used in each of said vector registers; setting means for setting said number MVL at the first storage means; control means responsive to a second instruction for transferring the content of said first storage means to either said scalar register or said main memory; second storage means for holding the number of said vector elements in said at least one vector register to be supplied to the functional means based on the content MVL of said first storage means transferred to either said scalar register or said main memory and the number N (a positive integer) of vector operations specified by a third instruction; and read-out means for sequentially reading out said vector elements in said at least one vector register to said functional means in response to the content of said second storage means.

BRIEF DESCRIPTION OF THE DRAWINGS

Other features and advantages of the invention will become apparent from the following description when taken in conjunction with the accompanying drawings in which:

FIG. 1 is a block diagram of a first embodiment of the invention;

FIGS. 2A and 2B are diagrams of formats of instructions to be used for the invention;

FIG. 3 shows a timing chart for illustrating the operation of pipelined processing;

FIGS. 4A and 4B are views for illustrating a source program and an object program;

FIG. 6 is a block diagram of an example of a main memory controller.

In the drawings, the same reference numerals represent the same structural elements.

PREFERRED EMBODIMENT

Figure 5:
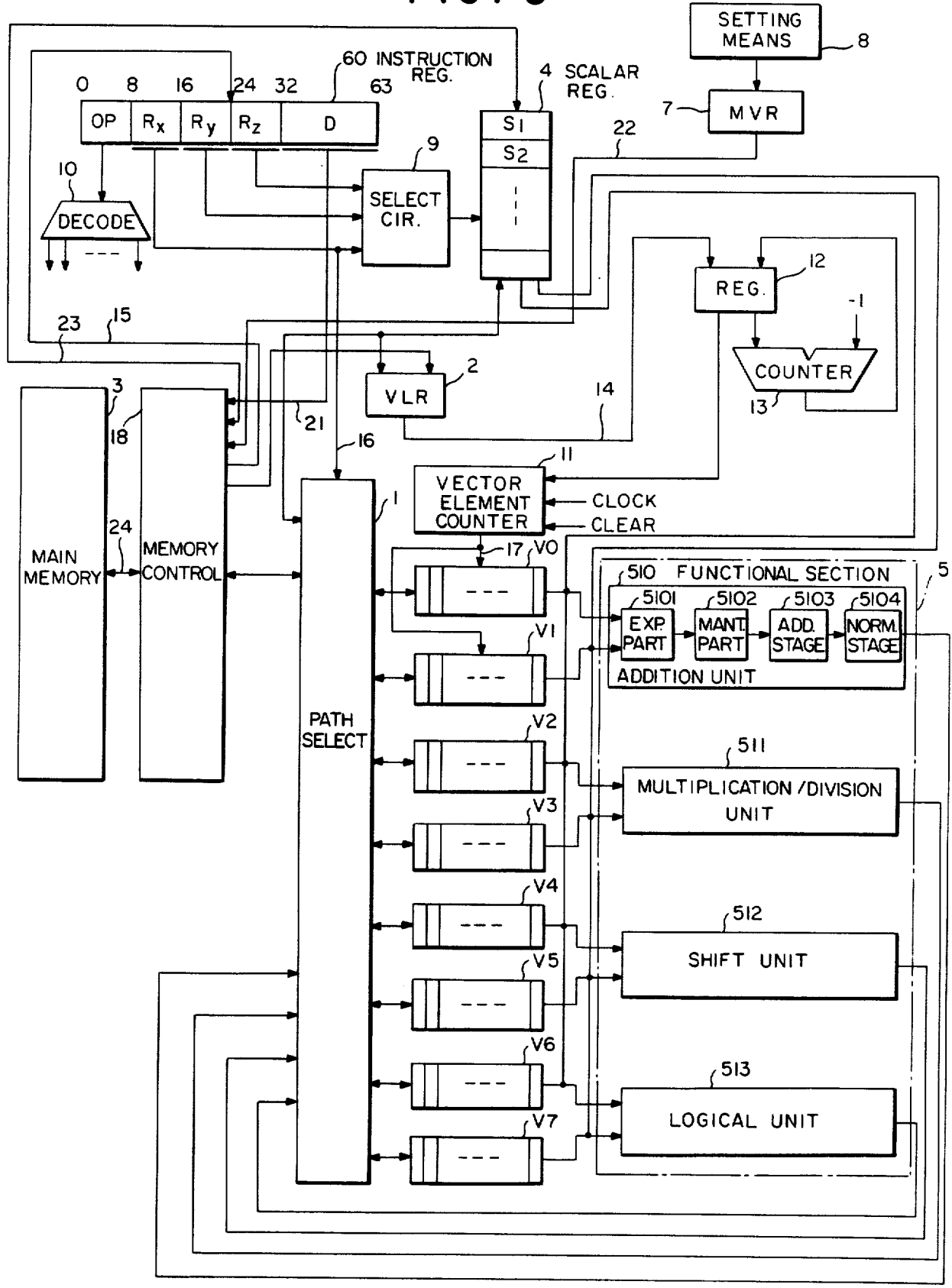
FIG. 5 is a block diagram of a second embodiment of the invention.

Referring now to FIG. 1, a first embodiment of the invention comprises a functional section 5 having an addition unit 510; a multiplication/division unit 511; a shift unit 512 and a logical unit 513; a main memory (MM) 3 having contiguous storage locations at which contiguous addresses starting at address 0 are assigned and which are one byte long, respectively; eight vector registers $V_0$ through $V_7$ having 64 storage locations, respectively; an instruction register 6, a maximum vector length register (MVR) 7; a scalar register group 4 consisting of 16 addressable scalar registers $S_1$ through $S_{16}$ used for scalar operations or address calculation; a selection circuit 9; a vector length register 2; a path selection circuit 1; a decoder 10; setting means 8; a vector element counter 11; a register 12; and a counter 13.

Referring to FIG. 2A, a first type of instruction having a first instruction format (RR) to be used in the embodiment (e.g., an arithmetic instruction or a memory access instruction) comprises an operation code field OP (bits 0 through 7), a result-register designation field Rx (bits 8 through 15), a first input-register designation field Ry (bits 16 through 23), and a second input-register designation field Rz (bits 24 through 31).

Referring to FIG. 2B, a second type of instruction having a second instruction format (RX) to be used in the embodiment comprises a displacement field D (bits 32 through 63) in addition to the fields identical to the first type instruction.

Referring back to FIG. 1, addresses 0 through 63 are allocated to 64 storage locations of each of the registers $V_0$ through $V_7$. Since each of the registers $V_1$ through $V_7$ can keep up to 64 vector elements, each of which has four bytes long, the MVL is 64. The registers $V_0$ and $V_1$ are connected to the unit 510, the registers $V_2$ and $V_3$ to the unit 511, the registers $V_4$ and $V_5$ to the unit 512, and the registers $V_6$ and $V_7$ to the unit 513, respectively. In the embodiment, since the connections between the section 5 and the registers $V_0$ through $V_7$ are fixed, the fields Ry and Rz are not used for vector operation instructions. The register 2 connected to the register 12 via a path 14 holds the number of vector operations specified by the instruction. The content of the register 2 can be set arbitrarily by the instruction from, for instance, the main memory 3, MM3. The field OP of the instruction loaded into the instruction register 6 from the MM3 via a path 15 is decoded by the decoder 10. The MVR 7 is set with the value of the MVL, for instance, 64 in the embodiment via the setting means 8. The setting means 8 may be composed of a jumper wire, a mechanical switch or a service processor for maintenance and diagnosis. It is also possible to use a special path such as a scan path. The circuit 1 functions to select paths for data transfers between the MM3 and the registers $V_0$ through $V_7$, the register group 4 and the registers $V_0$ through $V_7$, the section 5 and the registers $V_0$ through $V_7$ and the register group 4 and the section 5. The circuit 9 is responsive to the field Rx, the field Ry and the field Rz of the instruction to select corresponding scalar registers in the register group 4 as the output-register, the first input-register, and the second input-register, respectively. For instance, if the instruction taken out of the MM3 to the register 6 is a "Load" instruction for loading the content of the MVR 7 into the group 4, the circuit 9 selects corresponding scalar register in the group 4 in response to the field Rx of the instruction. Subsequently, the content of the MVR 7 is loaded through the path 19 in the scalar register which has been selected by the field Rx. The units 510, 511, 512 and 513 are each pipelined by a plurality of processing stages. Processing at each stage is synchronized and proceeded with clocks supplied from a clock supply source (not shown). For the construction and operation of such pipelines, reference should be made to a paper entitled "The IBM System/360 Model 91: Floating-Point Execution Unit" by S. F. Anderson et al, published in the "IBM Journal of Research and Developments", Vol. 11, No. 1, January issue, 1967, pp. 34–53. For instance, the unit 510 includes an exponent part comparison stage 5101 for comparing the exponent parts of two vector elements fed from the registers $V_0$ and $V_1$, a mantissa part digit alignment stage 5102 for performing the digit alignment of these element, an addition stage 5103 for the addition of the mantissa parts of these elements, and an addition result normalization stage 5104. As described below, in the case of vector addition processing, input data is sequentially supplied from the storage locations at the address zero in the registers $V_0$ and $V_1$ to the unit 510 in synchronization with clocks. At this time, the circuit 1 has been fed with the field Rx of the instruction in the register 6 via a path 16. The circuit 1 sequentially transfers the addition results, which are sequentially outputted from the unit 510, to successive storage locations of the vector register specified by the field Rx of the instruction. The content of the register 2, on the other hand, is temporarily stored in the register 12 at the beginning of execution of the vector addition processing and at the same time, the content of the counter 11 is initialized to "0". The counter 11 continues to count up in synchronizm with the clocks while the content of the register 12 is not "0". The output of the counter 11 is supplied to the registers $V_0$ and $V_1$ via a path 17 as addressing data, and the contents of the storage locations addressed thereby are supplied to the unit 510 as described above. The counter 13 subtracts "1" from the content of the register 12 in synchronization with the clocks and stores the result in the register 12 again. Such a counting up operation of the counter 11 and a counting down operation of the counter 13 continue until the content of the register 12 becomes "0". Such hardware as the register 2 and the counters 11 and 13 are also provided for a pair of the registers $V_2$ and $V_3$, a pair of the registers $V_4$ and $V_5$ and a pair of the registers $V_6$ and $V_7$, but omitted in the drawing for simplification's sake.

FIG. 3 shows a timing chart for illustrating the above-mentioned operation. In FIG. 3, $V_i(j)$ (i, j=0 to 7) denotes the content of the i-th storage location of the vector register $V_i$; $T_1$, the transfer cycle from the vector registers $V_0$ and $V_1$ to the unit 510; C, the cycle of the stage 5101; S, the cycle of the stage 5102; A, the cycle of the stage 5103; N, the cycle of the stage 5104; and $T_2$, the transfer cycle from the unit 510 to the addressed vector register.

Description will now be given on how a DO loop routine in a source program written in the FORTRAN language shown in FIG. 4A is performed. The DO loop routine in FIG. 4A represents that at least one statement between a DO statement and a CONTINUE statement is to be executed N times (N is an integer). In the embodiment, an object program as shown in FIG. 4B is generated from the source program of FIG. 4A. The operation of instructions to be used in this object program is listed in Table 1.

TABLE 1

| Instruction | Format | Operation |
|---|---|---|
| LDS Rx,M | RX | $Rx \leftarrow M(Ry + Rz + D)$ The content of the main memory addressed with the address obtained by adding the content (Ry) of the register specified by the field Ry, the content (Rz) of the register specified by the field Rz, and displacement D, is loaded in the |

TABLE 1-continued

| Instruction | Format | Operation |
|---|---|---|
| | | scalar register specified by the field Rx. |
| SMVL Rx | RR | Rx ← MVR<br>The content of the MVR is loaded at the scalar register specified by the field Rx. |
| ADD Rx,Ry,Rz | RR | Rx ← Ry + Rz<br>(Ry) and (Rz) are integer-added, and the result is stored in the scalar register specified by the field Rx. |
| AND Rx,Ry,Rz | RR | Rx ← Ry + Rz<br>The result obtained by the AND operation of (Ry) and (Rz) is stored in the scalar register specified by the field Rx. |
| SLL Rx,Ry,Rz | RR | Rx ← Ry < Rz<br>(Rz) is shifted to the left by the number of the bits specified by (Ry), and the result is stored in the scalar register specified by the field Rx. |
| OR Rx,Ry,Rz | RR | Rx ← Ry \| Rz<br>The result obtained by the OR operation of (Ry) and (Rz) is stored in the scalar register specified by the field Rx. |
| LVL Ry | | VL ← Ry<br>(Ry) is loaded in the vector length register (VL). |
| SUB Rx,Ry,Rz | RR | Rx ← Ry − Rz<br>(Ry) and (Rz) are integer-subtracted, and the result is stored in the scalar register specified by the field Rx. |
| BNZ Rx,M | RX | If the (Rx) is not "0", it is branched to the instruction in the MM addressed with the address obtained by adding (Ry), (Rz), and the displacement D. |

Referring now to FIGS. 4B and 1, description will be given to this object program. It is assumed that vector elements are stored at contiguous addresses in MM3 and one vector element occupies four contiguous addresses therein.

STEP (1): In response to the storing of the LDS instruction into the register 6, the number N of repetition is loaded by the program in the MM3 into the scalar register S1.

STEP (2): In response to the storing of the SMVL instruction into the register 6, the content of the MVR 7, that is, MVL (=64), is loaded into the scalar register S2 via the path 19.

STEP (3): The result obtained by the addition of the content (N) of the register S1 and "−1" by the unit 510 is stored in the scalar register S3 via the path 25, the circuit 1 and the path 26 in response to the storing of the ADD instruction into the register 6.

STEP (4): The result obtained by the addition of the content (MVL) of the register S2 and "−1" by the unit 510 is stored in the scalar register S4 upon storing of the ADD instruction into the register 6.

STEP (5): The result obtained by the AND operation of the content (N−1) of the register S3 and the content (MVL−1) of the register S4 by the unit 513 is stored in the scalar register S5 via the path 27, the circuit 1, and the path 26 in response to the storing of the AND instruction into the register 6.

STEP (6): The result obtained by the addition of the content of the register S5 and "1" is stored in the scalar register S6 in response to the storing of the ADD instruction into the register 6.

STEP (7): The content of the register S6 shifted to the left by 2 bits by the unit 512 so that "4" is multiplied by the content of the register S6 is stored in the register S7 via the path 28, the circuit 1 and the path 26 in response to the storing of the SLL instruction into the register 6. As a result, the storage location of the first vector element to be read out of the MM3 is obtained in the register S7.

STEP (8): The content of the register S2 shifted to the left by 2 bits by the unit 512 is stored in the register S8 in response to the storing of the SLL instruction into the register 6. As a result, the distance between the sets of the vector elements when the vector length is MVL is obtained.

STEP (9): Responding to the storing of the OR instruction into the register 6, "4" is stored in the register S9.

STEP (10): Responding to the storing of the LVL instruction into the register 6, the content of the register S6 is loaded into the register 2 via the path 20.

STEP (i+1) (i is an integer of 11 or more): The result obtained by the addition of the content of the register S9 and the content of the register S7 by the unit 510 is stored in the register S9 in response to the storing of the ADD instruction into the register 6. As a result, the read-out address of the next set of the vector elements in the MM3 is obtained for iteration.

STEP (i+2): In response to the storing of this OR instruction in the register 6, the content of the register S8 is loaded into the register S7.

STEP (i+3): The content of the register S6 subtracted from the content of the register S1 by the unit 510 is stored in the register S1 in response to the storing of the SUB instruction into the register 6. As a result, the number of the remaining vector elements which are not still processed is obtained.

STEP (i+4): In response to the storing of the OR instruction into the register 6, the content (MVL) of the register S2 is loaded into the register S6.

STEP (i+5): Responsive to the storing of the BNZ instruction into the register 6, the content of the register S1 is checked, and if the content is not "0", the procedures from STEP (10) are executed.

In a series of processing from STEP (3) to STEP (5), the remainder of (N−1)/MVL is computed by using the fact that MVL is generally the exponentiation of 2. The procedures up to STEP (9) are the pre-processing of DO loop operation.

In this embodiment, as is obvious from the foregoing statement, as the object program does not have the number of storage locations in each vector register, that is, MVL, as a constant, a common object program can be shared with systems with different storage capacitors of vector registers simply by changing the content of the MVR 7 with setting means 8.

Referring to FIG. 5, a second embodiment of the invention has the same construction as the first embodiment except for the additional provision of a memory controller 18 through which the content of the MVR 7 is transferred to the MM3.

Referring to FIG. 6, the controller 18 used in the second embodiment includes a three-input adder 181, an address register 182, and data registers 183 and 184. The instruction for the transfer of the content of the MVR 7 to the MM3 is the second type instruction. When such an instruction is stored in an instruction register 60, the selector 9 selects two corresponding scalar registers in response to the fields Ry and Rz of the instruction, and the contents of the selected scalar registers are supplied to two input terminals of the adder 181 via paths 23-1 and 23-2 of a path 23. As the field D of the instruction have been fed to the remaining one input terminal of the adder 181 via a path 21, they are added and the result is stored in the register 182. The content of the MVR 7 is temporarily stored in the register 183 via a path 22, and then is stored at the address of the MM3 addressed by the content of the register 182. The register 184 temporarily stores the data read out of the MM3. Namely, the register 184 functions as a buffer to transfer the data to the scalar register group 4 via a path 23-4 of the path 23. In this embodiment, as mentioned above, the vector operation instruction is executed after the content of the MVR 7 has been transferred to the MM3 instead of to the group 4.

The foregoing description relates to the preferred embodiments of this invention, but it is obvious to those skilled in the art that the invention can be easily put into practical application in various other manners.

What is claimed is:

1. A vector processing system comprising:
   a main memory for storing instructions and operands including vector elements;
   at least one scalar register;
   a plurality of vector registers each having a plurality of storage locations for storing said vector elements;
   functional means responsive to a first instruction for performing a predetermined operation for said vector elements supplied from at least one of said vector registers;
   first storage means for holding register length information indicative of the number of storage locations to be used in each of said vector registers;
   setting means for setting said register length information in said first storage means before a vector processing operation;
   control means responsive to a second instruction for transferring said register length information from said first storage means to said at least one scalar register and said main memory during said vector processing operation;
   second storage means for holding the number of said vector elements to be stored in said at least one vector register based upon one of (1) said register length information stored in said at least one scalar register and said main memory or (2) the remainder obtained by dividing a number (N) of vector operations specified by a third instruction by said register length information; and
   read-out means for sequentially reading out said vector elements in said at least one vector register into said functional means in response to the content of said second storage means.

2. A vector processing system as claimed in claim 1, in which said setting means comprises one of the group of a jumper wire, a mechanical switch, a console, a service processor and a scan path.

3. A vector processing system as claimed in claim 1, in which said second storage means holds said register length information when the remainder of the division of N by the register length information is zero at the starting time of vector processing, and holds said remainder when said remainder is not zero.

4. A vector processing system as claimed in claim 1, in which said second storage means holds the remainder when the remainder of the division of N by the register length information is not zero and the quotient thereof is one or more at the starting time of said vector processing, and said second storage means holds said register length information after completing read-out processing by said read-out means based on said remainder.

* * * * *